June 17, 1969  J. R. MOORE ET AL  3,450,229
AIR LINE LUBRICATOR
Filed June 21, 1967
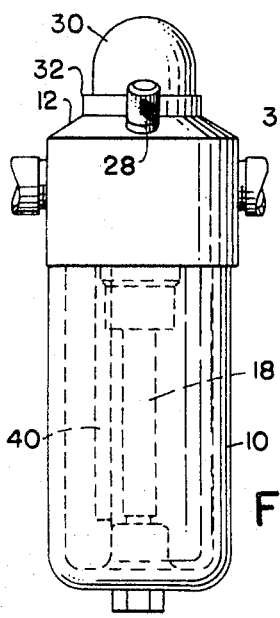
FIG.1
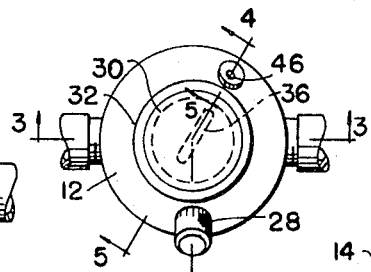
FIG.2
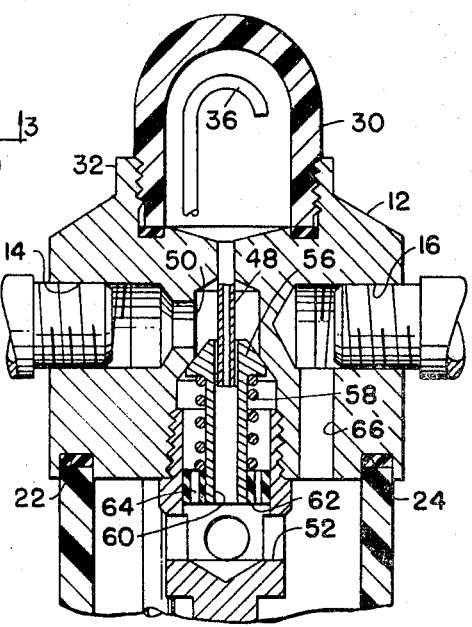
FIG.3
FIG.4
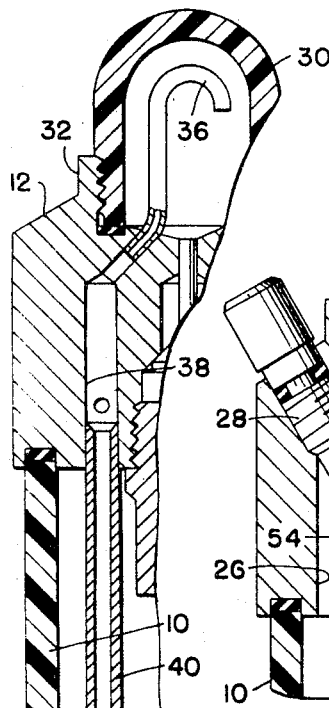
FIG.5
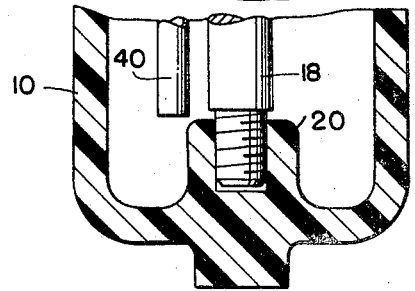
FIG.6
INVENTORS
JOHN R. MOORE
DANIEL J. DYLE
BY *Whittemore, Hulbert & Belknap*
ATTORNEYS

United States Patent Office 3,450,229
Patented June 17, 1969

3,450,229
AIR LINE LUBRICATOR
John R. Moore, Marine City, and Daniel J. Dyle, Mount Clemens, Mich., assignors to Monnier Bros., Inc., Algonac, Mich., a corporation of Michigan
Continuation-in-part of application Ser. No. 403,751, Oct. 14, 1964. This application June 21, 1967, Ser. No. 647,834
Int. Cl. F16n 7/34; F01m 1/08; C10j 1/12
U.S. Cl. 184—55                              1 Claim

ABSTRACT OF THE DISCLOSURE

An air line lubricator for supplying oil to compressed air, having an air passage provided with a constricted portion into which oil is supplied and entrained into the air stream, and a valve for automatically regulating the air flow through the constricted portion to regulate the quantity of oil in accordance with the supply of air. By-pass passages are also provided and are operable under certain conditions to maintain the desired pressure and flow characteristics over a wide range of conditions.

---

This application is a continuation-in-part of our co-pending application Ser. No. 403,751, filed Oct. 14, 1964, now abandoned.

The invention relates to a lubricating device adapted to be connected into a compressed air line to supply metered quantities of an oil mist to the air to provide lubrication for a tool or other device operated by the compressed air. A lubricator of this type is disclosed in Brush Patent No. 2,572,440, and the present invention constitutes an improvement over the lubricator disclosed in the Brush patent. In particular the invention provides a lubricator of this type having passage means in the cap to eliminate pressure surges in the air flow path through the device to obtain the desired pressure and flow characteristics over a wide range of conditions and thereby to equalize or balance the flow throughout the range of operation of the lubricator.

In the drawings:

FIGURE 1 is an elevational view of an air line lubricator embodying the invention;

FIGURE 2 is a top plan view thereof;

FIGURE 3 is an enlarged sectional view taken along the line 3—3 of FIGURE 2;

FIGURE 4 is an enlarged fragmentary sectional view taken along the line 4—4 of FIGURE 2;

FIGURE 5 is an enlarged fragmentary sectional view taken along the line 5—5 of FIGURE 2; and FIGURE 6 is a sectional view similar to FIGURE 3 showing a modified form of the device.

As illustrated in FIGURES 1–5, the air line lubricator comprises in general a bowl 10 providing a lubricant reservoir and a cap 12 for the bowl having an air inlet 14 and an air outlet 16. A bolt 18 threaded into a boss 20 in the bowl and into a threaded hole in the cap 12 secures the bowl to the cap. The cap is provided with an annular groove 22 into which the rim of the bowl seats, and a sealing gasket 24 is confined in the groove 22 so as to form a pressure-tight seal between the bowl and the cap. The cap is provided with an oil fill passage 26, the upper end of which is closed by a removable threaded plug 28.

The upper end of the cap 12 is provided with a dome 30 which is threaded into a boss 32 in the upper end of the cap so as to form a chamber 34, the dome preferably being formed of transparent material. A drip tube 36 is arranged in the dome and communicates with the bottom of the oil reservoir through passage 38 in the cap and oil pick-up tube 40. The dome and drip tube form an oil sight feed whereby the quantity of oil flow may be observed and determined. A bleed passage 42, 44 extend between the chamber 34 and the upper part of the reservoir, and an adjustable needle valve 46 is arranged in such passage whereby the rate of oil flow may be adjusted, the adjustment being such in any event that oil drips from the end of the tube 36 into the chamber 34.

A vertical air passage communicates at its upper end with the chamber 34 and at its lower end with the reservoir, and such passage comprises a tube 48, a multi-diameter bore 50 in the cap, and a passage through the upper end of the bolt 18 which terminates in lateral ports 52. A part of such passage forms a seat 54 for a valve 56 which is biased to closed position by a spring 58. The air inlet 14 communicates with the upper end of the bore 50 and the tube 48 extends through a central opening in the valve 56, such opening in the valve being larger in diameter than that of the tube so as to provide a fluid flow passage between the tube 48 and the valve 56. The valve 56 has an integral stem 60 which is slidable in a guide 62, which in turn is fixed in the bore in the upper end of the bolt 18. The guide 62 is provided with a series of holes 64 therein whereby when the valve 56 is open the fluid flow past the valve will be free to flow through the holes 64 and thence outwardly from the bore in the bolt 18 through the ports 52. A passage 62 in the cap provides communication between the upper end of the bowl and the air outlet 16.

From the construction illustrated it will be evident that the lubricant in the reservoir formed by the bowl 10 is subjected to the pressure of the air which flows through the lubricator, and this causes oil to flow through the oil pick-up tube 40 to the drip tube 36. The level of the lubricant in the reservoir should be just below the ports 52. The valve 46 serves to control the pressure differential between the reservoir and the chamber 34 in the dome whereby the rate at which the drops of oil issue from the tube 36 may be regulated. The flow of air through the bore 50 and past the lower end of the tube 48 serves to draw oil through the tube 48 from the chamber 34 and such oil is picked up by the flowing air and carried with it through the lateral ports 52, the upper part of the reservoir 10, the passage 66, and into the air outlet 16. Of course when the valve 56 is open, the flow of air through the open valve will serve to increase the suction effect through the tube 48 and the stem 60 and draw oil at a faster rate from the chamber 34.

Since the path of air flow makes a 180° turn, it will be evident that the larger drops of oil entrained with the flowing air will be precipitated out and returned to the bowl 10, thus insuring that the oil entrained with the air will be a fine mist.

The valve 54 automatically adjusts to varying air volumes without requiring manual adjustment. Thus, when more tools are hooked into the air line, the valve 56 will automatically open to provide increased air and oil flow so as to provide lubrication for the additional tools. This valve is disclosed in the aforementioned Brush patent. However, with the valve arranged as herein illustrated, a more continuous flow of oil is achieved with 5% to 15% of such oil drops entering the air stream in micron particles.

In the form of the invention shown in FIGURE 6, the cap 12 is provided with a by-pass passage 70 providing a direct communication between the bore 50 beneath the valve seat 54 and the outlet 16. In addition the stem 60 of the valve 56 is provided with one or more openings 72. When the valve 56 is seated, the air flow through the restriction formed by the tube 48 and the valve 56 will be as previously described. However, when the valve 56 is open there may be a pressure buildup within the bore 50 before the air can escape through the openings 64. The by-pass hole 70 eliminates the pressure surge in the bore 50 which would occur under certain conditions and discharges the air directly into the outlet 16. The holes 72 in the valve stem also serve to balance the flow, and the flow through the holes 72 will be from the chamber or bore 50 into the stem 60 under certain pressure and flow conditions. When there is a pressure drop in the bore 50, the holes 72 permit an excessive pressure of air in the stem 60 to exhaust directly into the chamber 50 and through the by-pass opening 70 into the outlet 16.

The provision of the by-pass hole 70 and the holes 72 in the valve 56 thus serve to equalize the performance of the unit over a wide range of pressure and flow characteristics so as to provide effective lubrication of the air from minimum flow conditions to the maximum capacity of the unit.

What we claim as our invention is:

1. An air line lubricator comprising a bowl providing a lubricant reservoir, a cap for said bowl having an air inlet and an air outlet, said cap having a dome thereon providing a chamber therein, a vertical passage communicating at its upper end with said chamber and at its lower end with said reservoir, a conduit extending from the bottom of said reservoir and terminating in a drip tube in said chamber for supplying lubricant to the latter, said air inlet being in fluid flow communication with said vertical passage, a fluid flow communication between the upper end of said reservoir and said air outlet, an adjustable air bleed between said chamber and the upper end of said reservoir, a valve seat in said vertical passage below said air inlet and a movable valve member engageable with said seat and biased to closed position against the direction of air flow through said passage, said valve member having a passage therein for a flow of air through said valve when the latter is closed and into which passage lubricant is drawn from said chamber by said flow of air, the lower end of said vertical passage and the passage in said valve member terminating in a mixing chamber having lateral ports above the lubricant level in said reservoir, said cap being provided with a by-pass communicating between said air outlet and said vertical passage below said valve seat, and said valve member having an opening therein connecting the passage therein with said vertical passage below said valve seat.

References Cited

UNITED STATES PATENTS 2,887,181   5/1959   Dillon.
3,062,322   11/1962  Borden.
3,064,760   11/1962  Shada.

LAVERNE D. GEIGER, *Primary Examiner.*

EDWARD J. EARLS, *Assistant Examiner.*

U.S. Cl. X.R.

261—78